Figure 1:
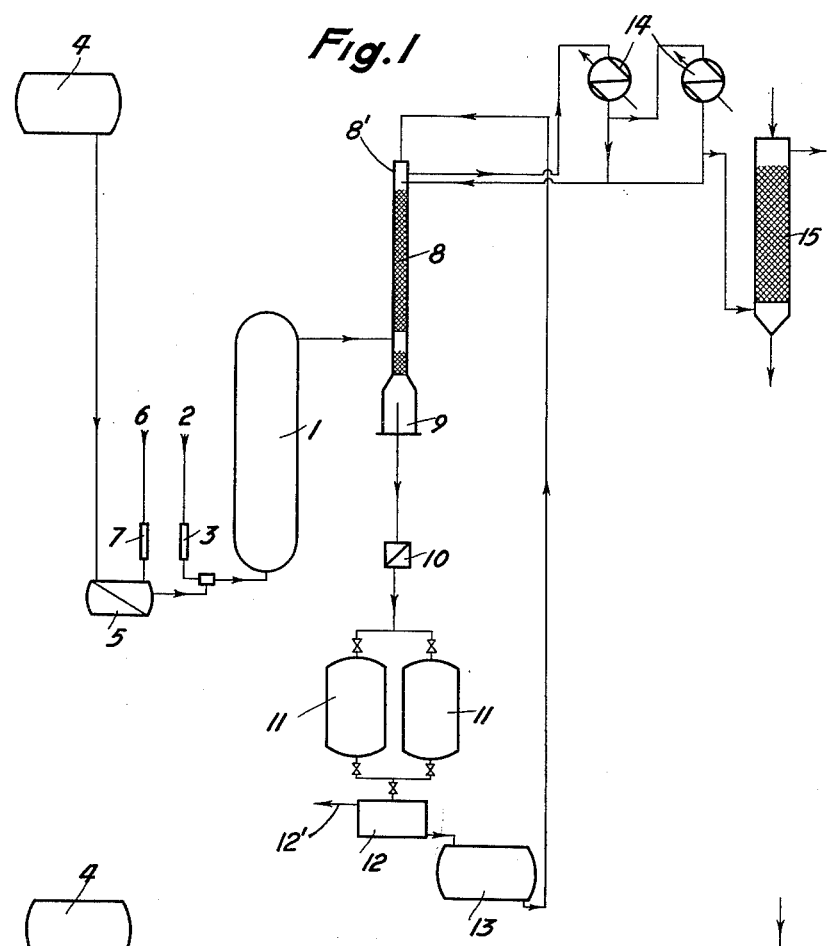

United States Patent Office 3,029,295
Patented Apr. 10, 1962

3,029,295
PREPARATION OF POLY-CHLORINATED
DIPHENYL DERIVATIVES
Robert Thermet, Grenoble, and Ludovic Parvi, Pont-de-Claix, France, assignors to Societe d'Electro-Chimie d'Electro-Metallurgie et des Acieries Electriques d'Ugine, Paris, France, a corporation of France
Filed Mar. 4, 1960, Ser. No. 12,834
Claims priority, application France Mar. 10, 1959
15 Claims. (Cl. 260—649)

This invention relates to a method of producing polychlorinated diphenyl derivatives, and more specifically the higher chlorinated derivatives of diphenyl, such as decachlorodiphenyl and products of approaching composition.

Methods of preparing chlorinated derivatives of diphenyl are known, which involve a direct chlorination of diphenyl, usually in the liquid phase, by injection of chlorine gas into liquid diphenyl in the presence of suitable catalyst material such as metal chlorides and/or metals. However, in such processes, if it is desired to bond as much as 6 or 7 atoms chlorine per molecule of diphenyl, the operating temperature during the chlorination step must be as high as about 120° C., while in order to attain 8 atoms Cl per diphenyl molecule, the temperature toward the end of the chlorinating step must attain a range of from 180 to 200° C. The liquid-phase chlorination process becomes quite unpractical when higher degrees of chlorination are desired, first because the necessary operating temperatures then become even higher owing to the high melting points of the more highly chlorinated derivatives, and second because the rate of reaction of chlorine with derivatives that have already attained a relatively high degree of chlorination becomes extremely slow.

Proposals have already been made to realize in vapour phase the reaction between chlorine, and diphenyl, U.S.P. 2,019,015 f.i. has proposed a method which consists in mixing diphenyl vapour and a halogen, in heating said mixture at a temperature between the boiling point of the diphenyl and the flaming point of the mixture; the corresponding reaction proceeds in the interstices or in the neighbourhood of a solid mass which may be catalytic and is coarsely crushed. Now the technicians are aware that direct reactions effected under such conditions result in complex mixtures of several chlorodiphenyls with formation of a high proportion of unusable by-products, especially of tars. Due to the insufficient and bad control of the temperature at the various points in the reaction zone, such by-products decrease in an important manner the yield of the transformation and that of the employment of the raw material used.

Applicants have tried to improve the processes in vapour phase, specially with the view of diminishing the formation of by-products, of providing products with limited fusion zone and, last, of increasing at will the chlorination degree to practically that of decachlorodiphenyl, wherein all the hydrogen of the diphenyl is substituted by chlorine.

Research by the applicants in the field of fluidization processes in relation to chlorodiphenyl production have now shown that it is possible to obtain the above-mentioned results by causing the reaction between chlorine and diphenyl to proceed in the vapour phase in the midst of a fluidized mass or bed.

In accordance with a basic aspect of the invention, therefore, an improved method of preparing the chlorinated derivatives of diphenyl including highly chlorinated derivatives approaching in composition that of decachlorodiphenyl, comprises passing a stream of gaseous mixture comprising a chlorine ingredient, a diphenyl ingredient, i.e. pure diphenyl and/or lower chlorinated derivatives of diphenyl, through a bed of fluidized material, preferably of a catalytic character, maintained at a temperature not less than the boiling point of the desired chlorinated end product. The relative proportions of the chlorine ingredient on the one hand, and the diphenyl ingredients on the other, are predetermined in accordance with the desired final degree of chlorination and the degree of chlorination, if any, of the initial ingredients. The rate of throughflow of the gaseous reagent stream is maintained sufficiently high so that the fluidized bed will be held in a condition of stationary, dense, fluidization, with the time of contact between the reagent stream and the fluidized bed preferably maintained within a range of from 2 to 20 seconds depending on the degree of catalytic activity, if any, possessed by the bed.

Where the end product to be produced is decachlorodiphenyl or a product of approaching degree of chlorination, the reaction temperature should be above 460° C., say in a range of from 470° to about 530° C., and preferably round about 550° C.

The fluidized bed comprises a highly divided mass preferably including a suitable catalyst incorporated in it, or having catalytic activity per se. One type of fluidized mass yielding excellent results is active carbon, though silica gel, alumina gel and diatomaceous earths have also given satisfactory results despite their somewhat lower chemical resistance. Inert materials such as sand may also be used although the efficiency yield and the quality of the end product are then poorer.

The fluidized carriers are preferably impregnated with active catalyst such as metallic salts, e.g. cupric chloride or barium chloride.

The fluidized condition used in the method of the invention is the condition known as "stationary dense fluidization." Such condition is characterized by the fact that the gaseous stream maintains the fine solid particles comprising the bed in a sufficiently spaced-apart condition so that the mass of particles is able to flow as a liquid, but such that the apparent volume of the mass will not exceed more than about 120% of the apparent volume of the mass with the particles at rest. This fluidized state is different from the so-called "suspended" or "dilute" state which would be produced by the action of a higher gaseous stream velocity and in which the particles are spaced apart at much wider mean distances from one another so that the mass would then occupy an apparent volume several times larger than that of the mass at rest. In the stationary dense fluidized state used in the invention, the fluidized mass which is capable of flowing as a fluid remains in the enclosure provided for it. Only a few very fine particles, usually occurring as a result of abrasion of the particles against one another, are driven or carried out of the bed; such particles may be collected by a cyclone or the like and recycled into the bed or otherwise recovered.

The granular size of the bed material and the velocity of the gaseous reagent stream referred to the empty reactor vessel and to the temperature and pressure conditions usually employed in the reaction in obtaining the stationary dense fluidized state described above, should in most practical cases be respectively selected within the following ranges: Granular size, 50 to 250 microns; flow velocity, 3 to 25 centimeters per second. Where the bed comprises activated carbon impregnated with cupric chloride, for a flow velocity of 5 cm./s. the granular size of the carrier is desirably selected within the range of from 60 to 200 microns approx.

To facilitate dissipation of the generated heat, the gaseous stream may desirably have some gas mixed therewith selected to be inert or unreactive in the conditions of the reaction, such as hydrochloric acid, nitrogen, or other suitable gases. Such admixture further serves to moderate the reaction and avert carbonization liable to yield non-uniform results.

Various methods may be used for removing the resulting chlorinated derivative from the effluent reaction mixture. One desirable method involves simultaneously condensing and dissolving the effluent product by spraying in a scrubbing column with a suitable solvent such as dichlorobenzene, trichlorobenzene, or the like, which is non-reactive with chlorine under the operating conditions, so as to obtain at the top of the column a gas comprising hydrochloric acid with possibly some unreacted chlorine and inert gas if any was used, and at the foot of the column a hot solution of the desired chlorinated derivative in the inert solvent. The solution may be maintained at the boil under moderate reflux in order to remove any remaining traces of chlorine and hydrochloric acid. Further, the solution may be filtered to remove therefrom any entrained catalyst particles that may have formed through attrition in the fluidized bed. Such purifying operations may be carried out in any desired order. Then the solution is allowed to cool to separate the high chlorinated derivative produced. Where the chlorination has been caused to proceed to a point approaching decachlorodiphenyl, this product will be found to separate in crystal form which may then be isolated from the mother-liquor by any conventional means such as centrifuging, draining or the like. The mother-liquor is preferably recycled through the scrubbing column with make-up solution as required.

Another way of separating the high-chlorinated diphenyl product is to condense the effluent in a cold chamber. If the product is decachlorodiphenyl or other high-chlorine derivative, it will then separate as a very fine powder which may, in many instances, be directly utilized after a simple de-gasifying step.

While the products obtained by the process of the invention are of high quality, they will generally contain some entrained catalyst particles. These may be separated by filtering the gaseous effluent at the inlet into the cool chamber. Or an additional recrystallization step may be performed in a conventional way.

Figure 2:
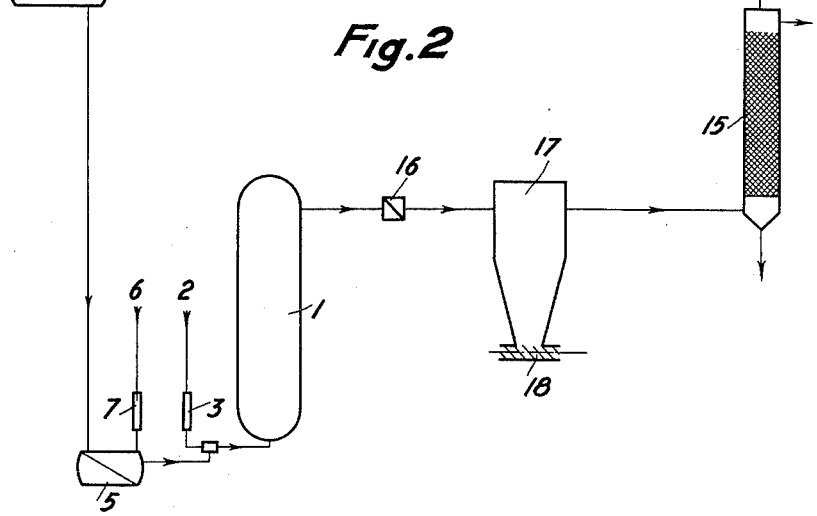

For a better understanding of the invention two exemplary embodiments of apparatus that may be used in performing the method are illustrated in diagrammatic form in the accompanying drawings, wherein FIG. 1 shows a first embodiment;

FIG. 2 shows a modification including special provision for isolating the decachlorodiphenyl.

In the apparatus shown in FIG. 1, there is provided a vertical reaction vessel 1. This reactor may be provided with external heating means in a relatively small plant, or it may simply be provided with heat lagging in larger plants. The fluidized bed is formed in this reactor 1. The chlorine is delivered at 2 and discharged into the base of the reactor 1 after passing through a preheater unit 3. The diphenyl stock is stored in a reservoir 4 whence it is delivered to the reactor 1 by way of an evaporator 5 which may also receive at 6 inert diluent gas passed through a preheater 7. The effluent gaseous stream from reactor 1 is delivered into the base of a washing column 8 provided with a boiler 9 at its base. The base of the column 8 is connected to discharge into a filter 10 and thence in parallel into a pair of crystallizing receivers 11, the combined output from which is delivered to a centrifugal separator 12 or the like, whence the crystals of the desired product are withdrawn at 12' while the mother liquor is discharged to a tank 13 to be thence recycled to the top 8' of column 8. The top of the column 8 is further connected through separate lines to a pair of heat exchangers 14 for the gaseous phase, discharging into an absorption column 15 for the hydrochloric acid.

In the modification shown in FIG. 2, the reactor 1 is connected through a dust-trap 16 with a chamber 17 provided with strong cooling means and having at its base a conveyor screw 18 for extracting the product, while the top of the chamber is further connected with the base of the column 15 for absorbing the hydrochloric acid as in the first embodiment. The dust trap or filter 16 serves to separate any fine dust from the catalyst mass entrained with the effluent.

Some examples will now be given describing the preparation of chlorinated diphenyl derivatives by the method of the invention, especial emphasis being placed on the preparation of polychlorodiphenyls, including decachlorodiphenyls and similar high-chlorine products.

*Example 1*

Apparatus similar to that shown in FIG. 1 was used in which the reactor 1 was 110 mm. in diameter and charged with 3000 cc. activated carbon impregnated with cupric chloride. The granular size of this catalytic bed was in the range from 60 to 200 microns. A gaseous mixture was delivered into the reactor 1 at a temperature of 260° C., with a composition and input rate such as to provide per hour 24.3 moles chlorine and 2.2 moles diphenyl. The temperature in the reactor became stabilized at 500° C.

The scrubbing column 8 was supplied with trichlorobenzene at a temperature of about 160 to 170° C.

In the above conditions, there was collected at the end of 12' an amount of polychlorodiphenyl crystals of technical grade in a yield corresponding to 338 grams per hour per liter catalyst. The melting range of the crystals, after separation of the effluent, was 290–296° C. The yield in polychlorodiphenyl was 92% in terms of the diphenyl used.

*Example 2*

The same procedure as in Example 1 was used, except that the diphenyl vapours were diluted with nitrogen. The gaseous stream introduced had a composition and flow rate such as to provide per hour 17.6 moles chlorine, 1.6 moles diphenyl and 8.0 moles nitrogen, at 260° C. The temperature of the fluidized bed became stabilized at 520° C.

There were obtained 780 grams per hour of technical polychlorodiphenyl corresponding to a yield of 98%. The melting range of the product was 298–300° C.

*Example 3*

The operating procedure was the same as in Example 2 except that the fluidized bed comprised sand having a granular size of from 50 to 125 microns.

The reaction stream was such as to provide per hour 14.3 moles chlorine, 1.3 moles diphenyl and 10.4 moles nitrogen, at 260° C. The temperature in the bed was stabilized at about 520° C.

From the effluent there were separated by crystallization 250 grams per hour of polychlorodiphenyl solidifying at 288° C., and simultaneously, after solvent evaporation, 218 g. per hour of a less highly chlorinated product solidifying at 140° C. and having a chlorination degree intermediate between that of octachlorodiphenyl and nonachlorodiphenyl.

*Example 4*

Apparatus similar to that of FIG. 2 was used for the chlorination of diphenyl. In the reactor 1, 110 mm. in diameter, 2500 cc. of activated carbon impregnated with cupric chloride and having a granular size in the range from 60 to 200 microns were placed.

Through this bed was passed a gaseous stream providing 17.6 moles chlorine, 1.6 moles diphenyl and 8.0 moles hydrochloric acid at 260° C. per hour. The temperature in the bed was stabilized at 510° C.

775 g. per hour of crude polychlorodiphenyl were obtained as a fine white powder having a melting range, after degasifying, of 294–296° C.

*Example 5*

The procedure used was that described in Example 3, but employed partially chlorinated diphenyl stock corresponding in composition to the formula $C_{12}H_7Cl_3$. Through the bed was passed a gaseous mixture providing 17.8 moles chlorine, 2.3 moles chlorodiphenyl and 6.9 moles nitrogen at 330° C. The temperature in the bed became stabilized at 500° C.

The yield per hour was 1110 grams (i.e. 370 g. per hour per liter catalyst) of crude polychlorodiphenyl as a fine powder having the melting point 300° C.

What we claim is:

1. A method of preparation, in a single stage of chlorinated diphenyl derivatives having a degree of chlorination up to 100%, said method comprising, passing a gaseous stream containing a chlorine gas ingredient and a diphenyl ingredient as essential ingredients therein through a fluidizable bed of divided material, maintaining the temperature in the bed at a value at least as high as the boiling point of a desired diphenyl derivative, and regulating the rate of through-flow of said gaseous stream so as to maintain said bed in a state of stationary dense fluidization.

2. The method claimed in claim 1, wherein said diphenyl ingredient comprises pure diphenyl gas.

3. The method claimed in claim 1, wherein said diphenyl ingredient comprises a relatively low-chlorinated derivative of diphenyl.

4. The method claimed in claim 1, wherein said bed has a chlorination catalyst incorporated therein.

5. The method claimed in claim 1, wherein said bed has a metal salt catalyst incorporated therein.

6. The method claimed in claim 1, wherein said bed material is selected from within the group consisting of activated carbon, silica gel, alumina gel and diatomaceous earths.

7. The method claimed in claim 1, wherein said bed material comprises sand.

8. The method claimed in claim 1, wherein said bed material has a granular size in the range from about 60 to about 200 microns.

9. The method claimed in claim 1, wherein said gaseous stream has a compatible diluting gas admixed therein.

10. The method claimed in claim 1, which includes the step of cooling the effluent stream for separating the product therefrom.

11. The method claimed in claim 1, which includes the step of filtering the effluent prior to separation of the desired product therefrom.

12. The method claimed in claim 1, which includes the step of simultaneously condensing and dissolving the effluent stream in a solvent unreactive with chlorine, and separating said product derivative from the solution.

13. The method claimed in claim 12, which includes the step of recycling the mother solution after separation of the product therefrom.

14. A method of preparation, in a single stage of chlorinated diphenyl derivatives having a degree of chlorination up to 100%, said method, comprising, passing a gaseous stream containing chlorine gas and diphenyl as essential ingredients therein through a fluidizable catalytically-active bed of divided material, maintaining the temperature in the bed at a value at least as high as the boiling point of a desired diphenyl derivative, and regulating the rate of through-flow of said gaseous stream so as to maintain said bed in a state of stationary dense fluidization, and maintaining the contact of said stream with said bed for a time in the range of from about 2 to about 20 seconds.

15. A method of preparation, in a single stage of highly chlorinated derivatives of diphenyl having a degree of chlorination up to 100%, said method, comprising, passing a gaseous stream containing a chlorine ingredient and a diphenyl ingredient through a fluidizable bed of divided material having catalytic activity for chlorination, maintaining the temperature in the bed in the range from about 460° C. to about 530° C., regulating the rate of through-flow of said stream so as to maintain said bed in a stage of stationary dense fluidity, and maintaining the contact of said stream with said bed for a time in the range of from about 2 to about 20 seconds.

References Cited in the file of this patent

UNITED STATES PATENTS

| 2,019,015 | McCullough | Oct. 29, 1935 |
| 2,608,591 | Lawlor | Aug. 26, 1952 |
| 2,756,247 | James et al. | July 24, 1956 |

FOREIGN PATENTS

| 370,020 | Great Britain | Mar. 24, 1932 |

UNITED STATES PATENT OFFICE
CERTIFICATE OF CORRECTION

Patent No. 3,029,295

April 10, 1962

Robert Thermet et al.

It is hereby certified that error appears in the above numbered patent requiring correction and that the said Letters Patent should read as corrected below.

Column 2, line 21, for "550° C." read -- 500° C. --; line 64, for "cenitmeters" read -- centimeters --.

Signed and sealed this 24th day of July 1962.

(SEAL)
Attest:

ERNEST W. SWIDER
Attesting Officer

DAVID L. LADD
Commissioner of Patents